United States Patent [19]

Nelson et al.

[11] 3,826,449
[45] July 30, 1974

[54] INFLATION AND EVACUATION SYSTEM FOR AN AIR CUSHION LANDING SYSTEM

[75] Inventors: Bud D. Nelson, Kent; William M. Brennan, Edmonds, both of Wash.

[73] Assignee: The United States of America as represented by the Secretary of the Navy, Washington, D.C.

[22] Filed: Sept. 21, 1973

[21] Appl. No.: 400,769

[52] U.S. Cl. .......................... 244/100 R, 180/124
[51] Int. Cl. ............................................. B60v 3/08
[58] Field of Search .......... 180/116, 124; 114/67 A; 244/12 R, 100 R, 100 A, 110 H, 98; 98/33 R, 33 A

[56] References Cited
UNITED STATES PATENTS
3,429,395  2/1969  Beardsley ...................... 180/124 X
3,790,110  2/1974  Earl .............................. 244/110 H FOREIGN PATENTS OR APPLICATIONS
1,338,368  8/1963  France ............................. 180/116

Primary Examiner—Duane A. Reger
Assistant Examiner—Paul E. Sauberer
Attorney, Agent, or Firm—R. S. Sciascia; Henry Hansen

[57] ABSTRACT

An air cushion landing system (ACLS) for an aircraft including a pair of wing pod-mounted inflatable trunks, and an air supply and exhaust system for inflating and deflating the air cushion trunks. For inflating, a swiveled fan driven from a high pressure turbine engine compressor bleed source directs incoming air from a sealable intake port to the respective trunk. For deflating, an actuator connected to a linkage network swivels the fan, plugs the intake port and opens an exhaust door positively drawing air out of the trunk and exhausting it to the atmosphere.

7 Claims, 4 Drawing Figures

PATENTED JUL 30 1974 3,826,449

PATENTED JUL 30 1974 3,826,449

INFLATION AND EVACUATION SYSTEM FOR AN AIR CUSHION LANDING SYSTEM

STATEMENT OF GOVERNMENT INTEREST

The invention described herein may be manufactured and used by or for the United States of America for Governmental purposes without the payment of any royalties thereon or therefor.

BACKGROUND OF THE INVENTION

This invention relates generally to the field of surface effect motor vehicles and more particularly to an improved inflation and evacuation system for an air cushion aircraft landing system.

The ACLS concept has heretofore been employed on transport planes having fuselage-mounted inflatable trunks. This concept was applied to high performance Navy fighter aircraft, such as the McDonnel-Douglas A-4, to permit landings and takeoffs from irregular surfaces as well as from improved airfields and aircraft carrier decks. Existing ACLS technology had to be tailored however to fit the rigid space, weight and performance constraints of the existing aircraft while insuring that there be no interference with weapon attachment, access to equipment in the lower fuselage, operation of the arrest hook and catapult bridle, etc. A configuration utilizing two wing pod-mounted trunks was optimally determined to most closely meet these objectives. A system for rapidly inflating and deflating the trunks was found to be necessary in order to minimize in-flight drag and prevent interference with weapons stores. The prior art does not reveal a system for rapidly and positively inflating and evacuating an air cushion trunk. A typical system found in the prior art uses a control valve to divert the flow of air from a compressor creating a venturi effect to induce evacuation of a pair of inflatable cells. The novel pivotable fan arrangement of the present invention presents a positive and thus more efficient air displacement system.

SUMMARY OF THE INVENTION

Accordingly, it is a general purpose and object of the present invention to provide a novel, improved, compact, lightweight, reliable, low-cost, rapid inflation and evacuation system for an air-cushion landing system. It is a further object to provide a novel system for rapidly and positively inflating and evacuating a resilient air cushion trunk. Yet another object of the invention is to provide an aircraft undercarriage device, including inflatable air cushion trunks, which can be positively inflated and deflated in an improved manner during flight.

These and other objects are accomplished according to the present invention by an inflation and evacuation system comprising an inflatable member with an inlet and an outlet therein, fan means pivotally mounted adjacent the inlet, and means for rotating the fan from an inflating position to an evacuating position. In the inflating position the inlet is open and the outlet is blocked, and in the evacuating position the outlet is open and the inlet is blocked.

DESCRIPTION OF THE PREFERRED EMBODIMENT

Figure 1:
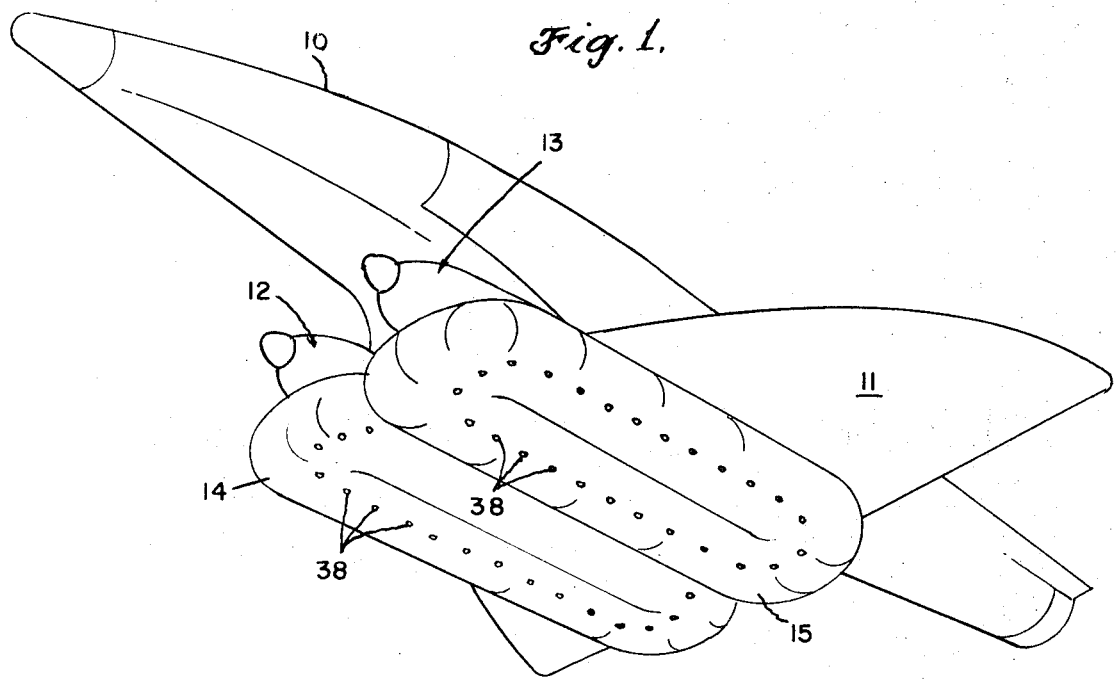
FIG. 1 is a schematic perspective view of an aircraft with dual wing pod-mounted inflated trunks.

Referring to FIG. 1 an aircraft, such as a McDonnel-Douglas A-4 Navy fighter aircraft, is shown including a fuselage 10 housing a turbojet engine (not shown), delta shaped wings having a lower surface 11 and a pair of pods 12 and 13 depending therefrom. It is to be understood that the invention hereinafter described may be embodied in any other type or style of aircraft, ground effect machine or air cushion supported device. Depending respectively from pods 12 and 13 are a pair of toroidal-shaped air cushion trunks 14 and 15, which may be constructed of any appropriate fabric or sheet material such as neoprene-coated nylon or polyurethane coated dacron suitable for folding and stowing in pods 12 and 13. Trunks 14 and 15 may be retracted into pods 12 and 13 respectively by independent retraction systems (not shown) housed in the pods. Trunks 14 and 15 contain a plurality of small holes 38 around their respective bottom surfaces allowing air to escape and form a peripheral jet for supporting the aircraft during takeoffs and landings.

Figure 2:
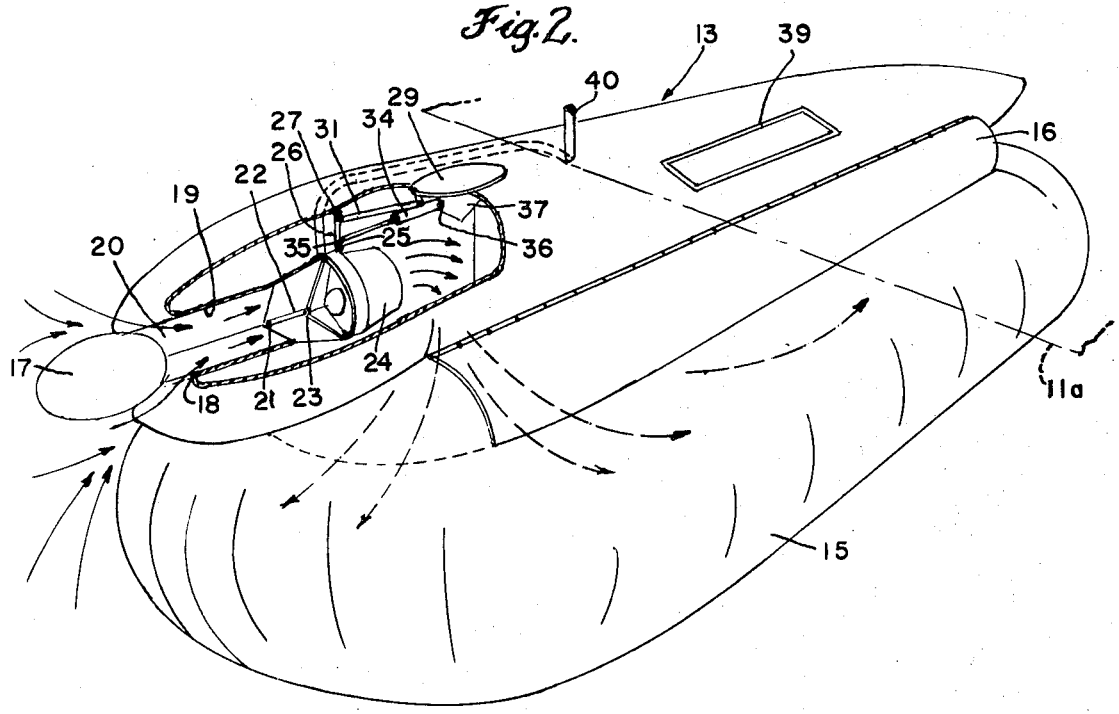
FIG. 2 is an enlarted schematic perspective view of one of the pods of FIG. 1 containing an inflation and evacuation system constructed according to the invention.
Figure 3:
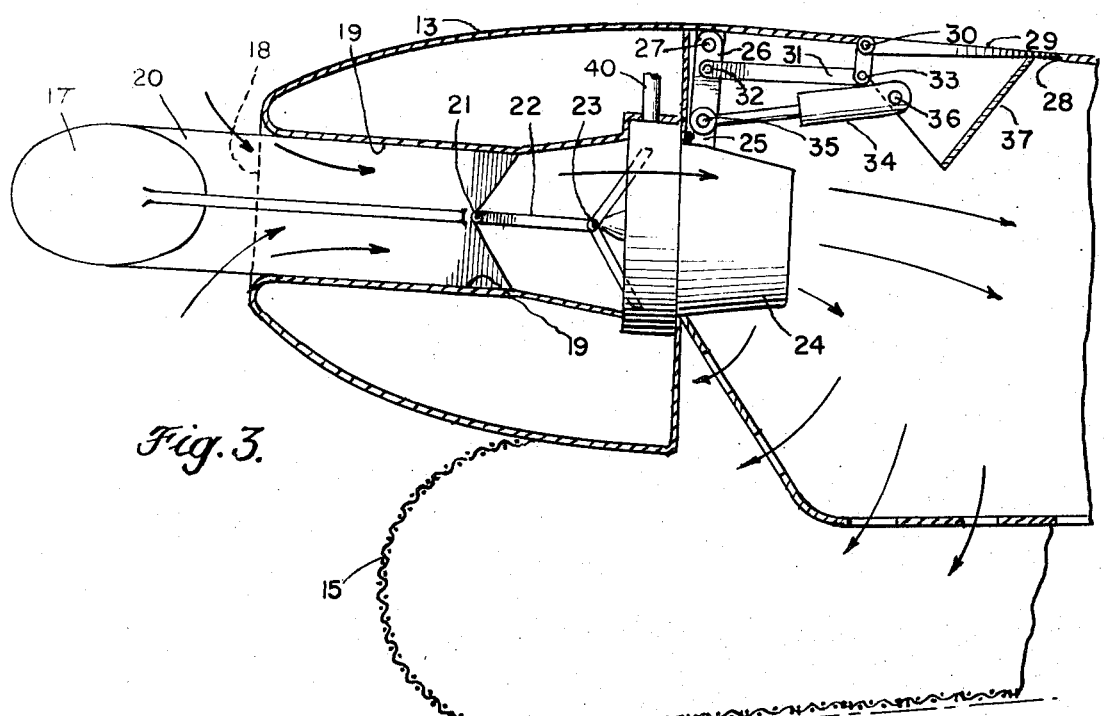
FIG. 3 is a side elevational view partially in cross section of the system of FIG. 2 shown in the inflating position.
Figure 4:
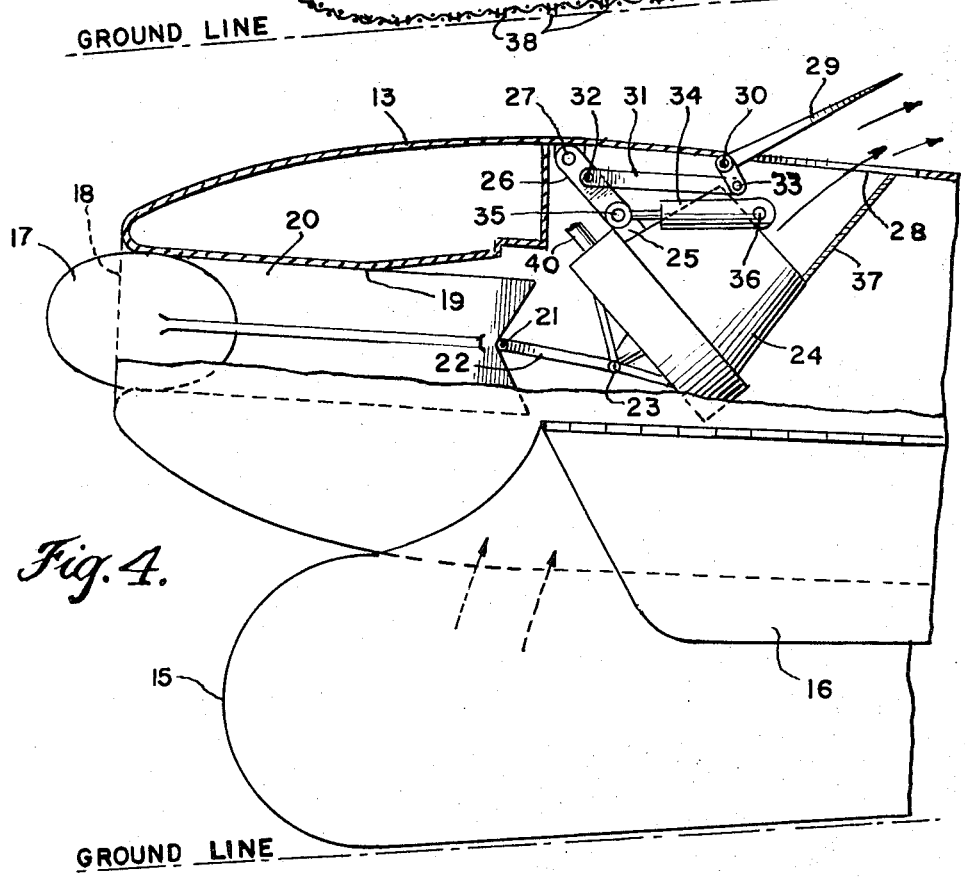
FIG. 4 is a side elevational view of the system of FIG. 2 shown in the evacuating position.

Referring now to FIGS. 2, 3 and 4, pod 13, which is identical to pod 12, is shown in greater detail. Pod 13 contains a door 16 hinged on the lower surface thereof which opens in a downward direction to allow deployment of trunk 15 from a deflated storage position within pod 13, and closes upon subsequent retraction of trunck 15 during flight to form a smooth, aerodynamically efficient surface. Pod 13 further contains an opening 39 for deploying one of the aircraft main wheels (not shown) housed in the pod through the middle of trunk 15. A plug 17 is formed to sealingly block an opening 18 to an air intake chamber 19 in the forwardmost portion of pod 13. Attached to plug 17 is a guide 20 which slides within chamber 19 and is pivotally attached at the end thereof to one end of a link 22 which is pivotally attached at its other end 23 to the intake side of a tip turbine fan 24 located at the interior end of chamber 19. Fan 24 is driven by high pressure air from a compressor bleed air supply taken off of the main gas turbine engine within fuselage 10 (FIG. 1). The air supply is connected to fan 24 by an auxiliary air duct 40 routed outside fuselage 10 at the engine bleed station (not shown), over the top of the wing root and through the wing forward of the wheel well into pod 13. Duct 40 becomes an articulated air supply line which enters the periphery of fan 24 impinging upon the turbine blades at the tips thereof and thus driving fan 24. It is to be understood that any other type of fan or means for supplying air such as an independent gas turbine engine or an electric powered fan could be used while still remaining within the spirit and scope of the present invention. Fan 24 is rigidly connected at the exterior of its housing to one end 25 of an elongated link 26 which is pivotally attached at its other end 27 to the interior of pod 13. Pod 13 has an opening 28 in its upper surface and an exhaust cover 29 pivotally connected to pod 13 at a pivot point 30 formed to sealingly block opening 28 in a closed position. Cover 29 is located just forward of leading edge 11a of lower wing surface 11 as shown in FIG. 2. A link 31 is pivotally connected to link 26 at point 32 and pivotally connected to cover 29 at point 33 for rotating cover 29 open during the evacuating cycle. An actuator 34 is pivotally connected at one end 35 thereof to link 26 and at the other end 36 to a structual member 37 rigidly attached to the interior of pod 13 and forming a duct for evacuating the air in trunk 15 to the atmosphere. Actuator 34 may for example be of a standard hydraulic type which can be remotely stroked by electro-hydraulic means such as a conventional solenoid operated control valve (not shown) by the pilot in the aircraft cockpit.

Operation of the system will now be described with reference to FIGS. 3 and 4. In FIG. 3 the system is shown in the inflating position with plug 17 disengaged from opening 18 allowing air to flow into chamber 19, cover 29 blocking opening 28 and fan 24 in a position for continuously supplying air to trunk 15. Actuator 34 is in a fully extended position during the inflating cycle. In FIG. 4 the system is shown in the evacuating position with actuator 34 stroked fully in rotating link 26, moving plug 17 into sealing contact with opening 18, opening exhaust cover 29 and rotating fan 24 to a position whereby the intake side is facing trunk 15 and the exhaust side is facing opening 28 for evacuating air in trunk 15 therethrough.

Some of the many advantages of the present invention should now be readily apparent. The preferred embodiment system affords a relatively simple apparatus for rapidly and positively inflating and evacuating an air cushion trunk, representing a distinct improvement over systems found in the prior art. In addition the apparatus is lightweight, compact and inexpensive, utilizing an existing aircraft power source to drive the fan. The system is highly reliable and easily maintainable due to its lack of complexity.

Obviously, many modifications and variations of the present invention is possible in light of the above teachings. It is therefore to be understood that within the scope of the appended claims the invention may be practiced otherwise than as specifically described.

what is claimed is:

1. A gas inflation and evacuation system comprising:

an inflatable member having an inlet and an outlet therein;
    fan means pivotally mounted within said member adjacent the inlet thereof for selectively directing air from said inlet to said member in an inflating position and from said member to said outlet in an evacuating position; and
    means operatively attached to said member for rotating said fan means from the inflating position to the evacuating position.

2. A system as set forth in claim 1 further comprising:
    said fan means including a plug articulated thereon for blocking said inlet when said fan means is pivoted to the evacuating position and a cover articulated on said fan means for blocking said outlet when said fan means is pivoted to the inflating position.

3. A system as set forth in claim 1 further comprising:

said fan means including a turbine fan driven from an external power source.

4. An inflation and evacuation system for an inflatable member depending from a vehicle, the member having a plurality of holes therethrough adjacent a supporting surface for providing an air cushion therebetween comprising:

container means interposed between the vehicle and the member having an inlet and an outlet therein;

fan means pivotally mounted within said container means adjacent the inlet thereof for selectively directing air from said inlet to said member in an inflating position and from said member to said outlet in an evacuating position; and
    means operatively attached to said member for rotating said fan means from the inflating position to the evacuating position.

5. A system as set forth in claim 4 further comprising:

said fan means including a plug articulated thereon for blocking said inlet when said fan means is pivoted to the evacuating position and a cover articulated on said fan means for blocking said outlet when said fan means is pivoted to the inflating position.

6. A system as set forth in claim 4 further comprising:
    said fan means including a turbine fan driven from an external power source on the vehicle.

7. A system as set forth in claim 5 further comprising:
    said container means including a torpedo-like, hollow structure formed to house the member in an evacuated state and having said inlet in one end thereof, a chamber communicating between said inlet and said fan, having said outlet along the length of said structure intermediate the ends thereof and an outwardly opening elongated door hinged along the length of said structure opposite to said outlet for deploying said member therethrough.

* * * * *